P. M. ACKERMAN.

Gate.

No. 58,566.

Patented Oct. 9, 1866.

UNITED STATES PATENT OFFICE.

P. M. ACKERMAN, OF WEBSTER, NEW YORK.

IMPROVEMENT IN GATES.

Specification forming part of Letters Patent No. 58,566, dated October 9, 1866.

*To all whom it may concern:*

Be it known that I, P. M. ACKERMAN, of Webster, in the county of Monroe and State of New York, have invented certain new and useful Improvements in Farm and other Gates; and I do hereby declare that the following is a full, clear, and exact description thereof, reference being had to the accompanying drawings, making part of this specification, in which—

Figure 1:
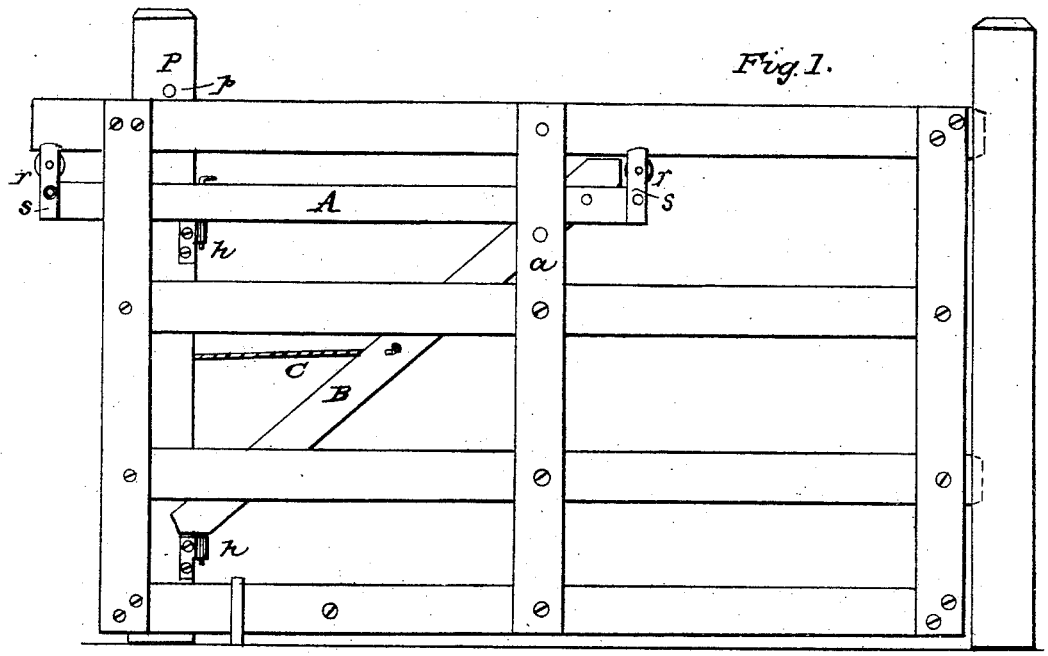
Figure 2:
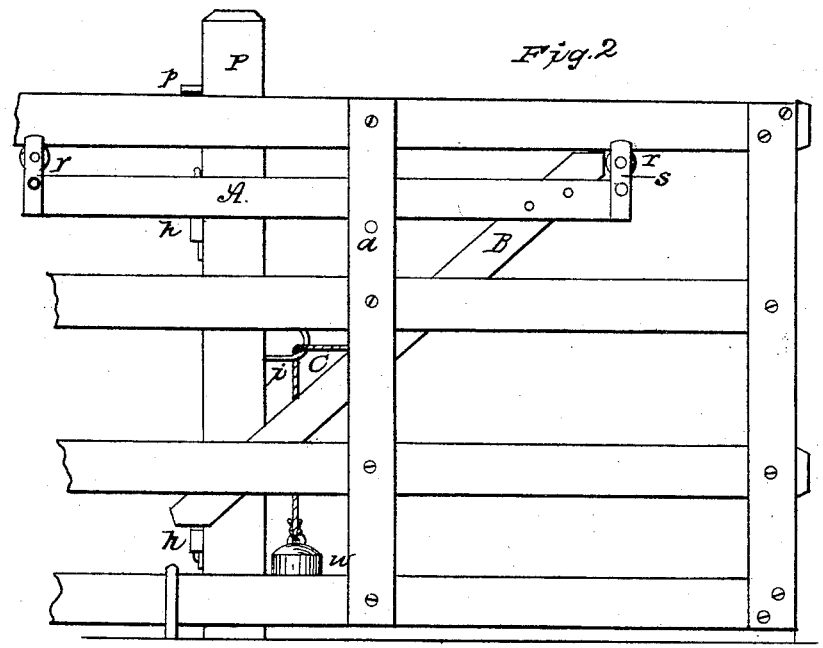

Figure 1 is a front elevation of the gate when closed. Fig. 2 is an elevation of a section of the same when open.

This invention relates to that class called "self-acting gates;" and it consists in suspending the gate upon a crane hinged to the hanger-post and attaching the weight-cord either to this crane or to the gate, whence it is passed through a pulley or a projecting loop.

To enable others to make and use my invention, I will describe its construction and operation.

I construct this gate similar to that shown in my application filed July 28, 1866; but in this case I suspend or hang the gate upon a crane, as shown in the drawings. This crane is composed of a horizontal bar, A, and a brace-bar, B.

The bar A is provided at each end, on the top, with an anti-friction roller, r, which is supported between two iron straps, s, riveted or otherwise attached to the bar. The bar is hinged to the post P, so as to reach some distance beyond the post, as seen in the drawings, and it is firmly sustained in position by the diagonal brace B, the foot of which is also hinged to the post.

The hinges h should be so hung as to allow the gate to swing clear of the post when in the open or the closed position. The weight-cord C, as here shown, is attached to the brace B of the crane, and consequently will not cause the gate to slide open, this being done by the attendant; but by attaching the cord to the upper bar of the gate, as in my former application, the weight will cause it to retract, as in that case, as well as to swing.

The pin p is designed to prevent the gate from being lifted from its hinges while it is closed. The pin a reaches under the bar A, and prevents the end of the gate from being raised out of place, especially when the weight-cord is attached to the bar of the gate. Any suitable fastening may be used.

There may be a swiveled pulley substituted for the loop i, Fig. 2.

This gate may be made self-acting both ways, if desired, by placing a suspension-post at a proper distance from the gate on each side. Each of these posts should be provided at the top with a double pulley, through which a cord would run from two separate weights. One weight would be attached to the gate similarly to that hereinbefore shown, but hung farther up on the post P, and would open the gate by pulling the cord on either side post, which would raise the other or closing weight, that being similarly suspended, but attached to the rear or left end of the gate, thereby causing it to swing back and slide shut by drawing the cord to raise the other weight, w, after passing through, and vice versa.

The closing-weight should be somewhat heavier than the opening-weight, so as to secure the closed position of the gate when left.

What I claim as my invention, and desire to secure by Letters Patent, is—

1. Suspending the sliding gate upon the swinging crane, substantially in the manner and for the purposes herein shown and described.

2. The swinging crane or frame, constructed, arranged, and operating substantially as herein shown, and for the purposes set forth, in combination with the sliding gate.

P. M. ACKERMAN.

Witnesses:
 EDWIN S. COYE,
 WM. S. LOUGHBOROUGH.